Patented Oct. 6, 1936

2,056,455

UNITED STATES PATENT OFFICE 2,056,455

MOLDING POWDER AND PROCESS OF MAKING THE SAME

Arthur M. Howald, Toledo, Ohio, assignor, by mesne assignments, to Plaskon Company, Incorporated, a corporation of Delaware No Drawing. Application November 10, 1930, Serial No. 494,693. Renewed August 21, 1936

16 Claims. (Cl. 106—22)

This invention relates to molding powders and processes of making the same; and it comprises as a new composition of matter a particular dry composition of formaldehyde and urea in molecular proportions between 1.05:1 and 1.55:1, said composition being soluble and fusible and in the fused state solidifying or setting to a hard, glassy, infusible body; and it also comprises a dry granular molding powder containing such fusible composition in amount permitting convenient molding under heat and pressure and also containing inert matter or filler, such inert matter being sometimes a previously set matter of the same composition and sometimes an ordinary filler such as wood flour; said powder sometimes also containing a modicum of another fusible material or of a dye or of both; and it further comprises a method of producing a certain new dry soluble fusible condensation product of urea and formaldehyde wherein formaldehyde and urea are admixed in a slightly acid solution in molecular proportions somewhat in excess of 1:1 and materially below 2:1, admixture being at room temperature and the acidity being ordinarily about 5 to 6 pH and being insufficient to produce reaction with formation of a precipitate, and the solution is evaporated at a low temperature, often in the presence of admixed filler; the urea of the mixture being sometimes replaced in part by another material capable of reaction with formaldehyde, such as thiourea or resorcinol and the filler when used being either previously set material of the same nature or an ordinary filler such as wood flour; all as more fully hereinafter set forth and as claimed.

Many ways of producing products from urea and formaldehyde useful in the plastic arts have been proposed and occasionally articles of excellent properties have been produced. It has however not proved practical on a commercial scale to produce regularly hard high grade finished articles free of internal stresses and strains or of a sufficiently stable chemical character to withstand sunlight and atmospheric influences. At their best, clear, hard, glassy materials can be made having most of the advantageous properties of glass with the additional advantage that they can be readily machined, cut, threaded, etc. Their color is water white and can be changed by dyes to any delicate pastel shade that is wanted. Where a filler is used the material is much like porcelain. With these high grade articles the electrical properties are excellent; and particularly the dielectric properties. There is much less power loss in situations where a condenser action comes into play than is the case with the artificial resins now largely used in radio sets.

In most of the proposed processes urea and a formaldehyde solution are caused to undergo a preliminary condensation or reaction at a temperature around 100° C.; this being considered a necessity and considerably higher temperatures with pressure have been proposed. Ordinarily, also the proportion of formaldehyde to urea is large; the amount of formaldehyde being at least equal to that of urea; or, in molecular proportions, at least 2:1. In the standard method initial condensation is at a high temperature and then the liquid product is evaporated to a viscous consistency; the gelled product being afterwards baked at 80° C. to give the hard final material. From this material, which is a sort of cast cake representing a highly polymerized material, articles are made by cutting to shape and dimensions. In baking much formaldehyde and water are driven off and shrinkage is large. With an initial molecular ratio of 2:1 about 0.5 molecule of formaldehyde or 12 per cent by weight, must be disposed of somehow, as I have found, in making the best glassy articles. Retention of any water or free formaldehyde in the finished article leads to deterioration. This dissipation of formaldehyde is not only wasteful but renders production of uniformly shrunk, strainless, non-vesicular cast cakes a matter of much difficulty.

In the present invention a method is provided wherein the amount of formaldehyde used is limited to that wanted in the finished materials.

Formaldehyde and urea react together under different circumstances to form a variety of products of reactions which are mostly complex and little understood and which involve condensation with exit of $H_2O$ and polymerization, the formaldehyde and the urea disappearing as such. It is however convenient to speak of the resulting products as combinations of urea and formaldehyde and this will be done hereinafter. Very many products of widely different properties can be made by using different catalysts and by varying proportions and conditions; but not many have been extensively investigated. For the most part these products are amorphous insoluble precipitates, or gels. Combination takes place with a considerable evolution of energy as heat; and the products are little reactive. In a general way it may be said that combination in alkaline solution tends to the production of soluble simple condensation products while in acid media reaction goes further, giving the stated insoluble bodies as precipitates or gels.

One product which represents the maximum saturation of urea with formaldehyde is dimethylol urea CO : (NH.CH2OH)2; formed by the union of formaldehyde and urea in a 2 : 1 molecular proportion. This is a water soluble crystalline body which can be formed under alkaline conditions where the solution contains 2 mols or more of formaldehyde for each mol. of urea. In acid solution the ratio must be greater than 2 : 1 to force a formation of dimethylol urea. Dimethylol urea when dry or exposed to heat tends to lose formaldehyde and water with formation of indefinite, infusible end products. Under alkaline and refrigerative conditions, in the presence of only one molecule of formaldehyde for each molecule of urea, that is, in a 1 : 1 ratio, monomethylol urea (CO.NH2NH.CH2OH) is produced. This is also a water soluble crystalline body. It will be noted that both the bodies are unpolymerized, being each formed from a single molecule of urea and they are of simple definite constitution. Both are laboratory products and neither has developed any utility for practical purposes.

The results are quite different in acid media. On the addition of any substantial amount of urea to commercial 35–40 per cent aqueous formaldehyde solution, which is always acid with a pH below 4, reaction ensues with development of heat which may be sufficient to bring the liquid to a boil and cause production of precipitates or irreversible gels unless the proportion of formaldehyde is considerably in excess of 2 : 1. Not much is known of the ill-defined amorphous insoluble materials (Dixon, J. Lond. Chem. Soc. 1918, vol. 113, page 238) so formed but two are alleged to be "methylene urea" and "Goldschmidt's compound", $(C_5H_{10}O_3N_4)_n$—the value of $n$ being unknown. The value of $n$ depends on the degree of polymerization of the precipitate or gel and this probably varies considerably under different conditions. The formula represents as a least value the product of the interaction of formaldehyde and urea in the molecular ratio of 3 : 2; a product which should contain about 32 per cent nitrogen. Precipitates containing about this amount of nitrogen can be obtained quite generally from acid solutions containing formaldehyde and urea in these proportions; and about this percentage of nitrogen occurs in some of the hard glassy final products of the prior art. I believe therefore, I have some warrant for assuming that these vitreous bodies represent Goldschmidt's compound as a still further polymerized continuum.

I have found in operating at the ordinary room temperature with acid solutions of restricted acidity that on addition of urea while condensation with evolution of heat takes place there is no separation of Goldschmidt's compound as a precipitate or gel if the temperature does not rise too much and that solutions are formed of sufficient stability to withstand evaporation at low temperatures to produce a dry product. This dry product on heating however undergoes polymerization; it at first fuses and then sets to a continuum. The proper acidity for operation depends on the temperature and with effective cooling to prevent rise in temperature it may go as high as pH 4. Slower interaction but safer operation is given with less acidity—say between pH 5 and pH 6. With pH 6 the liquid is more mobile and easier handled in evaporation and in impregnating paper and fillers precedent to evaporation. On the other hand, with pH 5 the dry product sets somewhat quicker under heat and pressure. It is sometimes convenient to work with a pH of 6 up to the time of drying and then develop a little greater acidity, say pH 5 or even pH 4. With either pH value and with the reaction temperature kept below say 60° C., at all times, there is no development of insolubles in reaction which will not go into solution again on slightly warming. High temperatures are more dangerous near the beginning of the action than later. Reaction at an average temperature of, say, 30° C. requires some hours for completion. Four hours are sufficient but it is often convenient to let the liquid mixture made by dissolving urea in partially neutralized commercial formaldehyde solution stand over night. Neutralization to secure the desired pH may be with any suitable base. Triethanolamine has some advantages and is recommended, triethanolamine being an organic amine non-active with formaldehyde. It leaves no mineral salines in the composition. Guanidin and other organic bases may be used. However, in the small amounts necessary, potash and soda do no harm.

The formaldehyde and urea may be mixed in Goldschmidt's proportions of 3:2 molecules or, by weight, 3 parts of CH2O to 4 parts of CO:N2H4; using commercial aqueous formaldehyde solution and dissolving in it the proper amount of urea. Alkyl and aryl substituted ureas may be used in lieu of, or in partial replacement of ordinary urea; ethyl urea or benzyl urea for example; using the same ratios. Thiourea may be used and is often convenient as an admixture with ordinary urea.

Goldschmidt's proportions are 1.5:1, but this ratio permits of some variation. The best results are obtained in the range 1.55:1 and 1.05:1. Final glassy articles of the best stability are obtained with proportions somewhat below Goldschmidt's 1.5:1 ratio, say about 1.3:1. This is the initial proportion and in the dry condensation product the formaldehyde is somewhat less, due to a slight loss of formaldehyde as gas during evaporation. This loss however is small. The nitrogen content of the finished material is about 33 to 35 per cent. The yield of product depends on the particular ratios of formaldehyde and urea used. With a ratio of 1.2:1, the yield of finished product is 1.35 times the dry weight of urea employed. With an initial ratio of 1.5:1, the yield of finished product is ordinarily about 1.45 times the dry weight of urea employed.

A liquid reaction product with about 50 per cent solid and at a pH of 6 can be readily evaporated and dried by spraying into a current of warm air. The physical moisture present in the dried product may be brought as low as 2 per cent. Liquid materials made with a pH of 5 are somewhat more gummy and do not spray as well but may be brought to dryness in other ways. However made, the dried material is water soluble unless a temperature of 50 or 60° C. is exceeded during preparation or drying. In this event however unless there has been undue heating it is still readily dispersible in water. The spray dried material is a powder which is convenient for packaging and storing.

The dry material can be packaged and stored indefinitely, undergoing no alteration in keeping. It is convenient for use in preparing a cold water varnish or lacquer. On addition of about its own weight of water it forms a thick solution readily brushed and sprayed. Applied to a surface a film at first dries and then polymerizes, giving a lustrous water resistant lacquer coating. The dried material may be mixed with neutral pigments to give a cold water paint.

The dry material may be physically mixed with fillers, such as wood flour to produce a molding powder.

Where compositions containing fillers are desired for molding it is however most convenient to incorporate the filler with the liquid prior to evaporation. The moist mixture so made may be directly dried in an air current producing a dried mixture of reaction product and filler which is of the same order of fineness as that of the filler used; there being no substantial sticking or agglomeration during drying. After drying the material may be packaged and stored indefinitely. When wanted for use a suitable amount is weighed into a mold and heat and pressure applied. Usually a temperature around 140° C. and a pressure of one ton per square inch are used. At this temperature and under this pressure there is no substantial evolution of volatiles. There is not enough to cause vesiculation, blistering or pitting. The molded article when cold is free of stresses and strains and withstands an accelerated test of boiling with water for one hour. In the absence of dye its color is that given by the filler. With mineral fillers, such as blanc fixe, the article resembles porcelain.

In another advantageous application of my new condensation product the cold liquid made as previously described is used to saturate paper or fabric and the paper or fabric dried at a low temperature as before. A number of sheets of paper or fabric so treated can be assembled and hot pressed to give a laminated material of attractive properties which can be used for radio panels and similar purposes. It may be of any color desired.

Where clear or translucent articles consisting wholly of the final reaction product are desired, they may be secured by the artifice of using fine ground, previously hardened condensation product as a filler. For example, flawed pieces from prior operations may be ground to a fine powder and mixed with the liquid cold condensation product as a filler; the mixture being dried as before. Or, Goldschmidt's product in granular form, obtained by precipitation, after washing and drying, may be used as a filler in admixture with the cold liquid condensed product described.

Shaped or partially shaped molded articles of paper pulp or other fibrous materials may be impregnated with the liquid, dried and/or baked. Pressure in the setting operation is not absolutely necessary although when practicable it is always advantageous.

In the production of sheet material for fancy boxes, radio panels, etc., the initial liquid material is taken up in paper, one or more layers of paper assembled and the whole hot pressed.

Other materials than ureas can sometimes be used in admixture and are sometimes convenient as plasticizers; such as resins, castor oil, etc. Since these materials are insoluble in water, however, they are to be added to the dried granular material as physical admixtures. An admixture of a little of the resin known as "Glyptal" carrying some phthalic anhydrid in solution is particularly useful. This resin does not melt until molding temperatures are reached and when it does melt it liberates phthalic anhydrid to increase the acidity of the mixture; something which is advantageous. Other advantageous substances carrying masked acidity are beta-bromcinnamic acid and its salts which at molding temperatures liberate free HBr.

Materials made under the present invention are permanent and long lived, withstanding an exposure to atmosphere, sunlight and most chemical reagents. Even hot acids, unless tolerably concentrated do not affect them. They withstand an accelerated test of boiling in water for one or more hours.

Somewhat more resistance to boiling water and atmospheric actions may be obtained by incorporating a little resorcinol and formaldehyde in the original solution; these additions being best in the molecular ratio of 1 to 2. The resorcinol addition, however, gives a somewhat darker color to the final product and is therefore not desirable when light pastel shades are wanted.

It is convenient to keep a white stock powder with other smaller stocks of intensely dyed powders in various colors for admixture therewith when any particular color is desired. Provision of these differently colored stocks also makes convenient the production of articles of variegated color.

In another and copending application Serial No. 484,719, filed September 26, 1930, I have described and claimed another method of operation in which a preliminary heating for condensation is not used. The final purpose, the production of a molding powder, is the same as here but the mechanism of action is quite different. In the acknowledged application urea is condensed with a relatively large amount of formaldehyde, about 2 molecules of the latter for one of the former, condensation being in the cold. After the condensation is effected a further amount of urea is added. In the present invention all the urea used is added to all the formaldehyde in the beginning. The condensation or chemical reaction between the two therefore takes another course. Excellent molding powders may be made in either way.

The dried primary reaction product may be softened by heat and forced into molds to give shaped articles; the casting being kept hot merely long enough for polymerization. There being no substantial loss of volatiles there is little shrinkage or production of internal strains. This method is convenient in producing bar stock for lathe work; or articles to be finished mechanically, lenses for example.

It is considered that on the whole it is best to maintain an average temperature of about 30° C. during the initial action of urea and formaldehyde on each other. The first effect of adding urea is to chill the liquid and it is sometimes advisable to heat the formaldehyde solution to a temperature sufficiently high above 30° C. to compensate for the chilling effect of the urea. In the course of the reaction heat is developed and with the solution at any time at a temperature of 50° C. (especially at first) the evolution of heat becomes sufficiently rapid to bring the liquid to a boil and undesired reactions occur. By using commercial formaldehyde solution of 35 to 40 per cent and preserving the temperature around 30° C. no self accelerating development of heat takes place. In a way, in the present invention, condensation is segregated from polymerization; condensation being effected in water solution and all actions arrested by drying the solution. On now heating the dried material to 140° C. or thereabouts the arrested polymerization now takes place and solid materials are formed.

The procedure described ante may be summarized in a step by step manner as follows:

A somewhat acid commercial formaldehyde solution is partially neutralized and adjusted to a pH of about 6 by the addition of a suitable amount of triethanolamine. Sufficient urea is dissolved in the so-treated formaldehyde to give a molar ratio of formaldehyde to urea of 1.5:1. The solution is maintained at about room temperature (20–30° C.) until the formaldehyde and urea have combined. Permitting the solution to stand overnight is convenient. Then the reaction is arrested by drying at low temperatures (below 60° C.). This may be effected by mixing sufficient paper pulp with the mobile solution of initial reaction product, to give a moist mass of paper pulp impregnated with reaction product and then drying the moist mass in a current of air, the drying temperature being below 60° C. A satisfactory molding composition is obtained.

It is advantageous to adjust the acidity of the solution to a pH of 4 to 5, just prior to drying.

A substance developing acidity during hot pressing may be advantageously added to the dried molding composition or powder. For this purpose, the beta-bromcinnamic acid or other materials carrying masked acidity, mentioned ante, may be used.

The molding composition and powders thus prepared are molded at around 140° C. and under pressure of about one ton per square inch. Under those conditions, there is no substantial evolution of volatiles; evolution of volatiles sufficient to cause vesiculation, blistering or pitting. The molded articles are high grade, stable products, withstanding an accelerated test of boiling with water for one hour.

What I claim is:

1. As an improvement in the manufacture of hard, molded, permanent, stable, infusible articles from urea and formaldehyde, the improved process which comprises instituting a reaction between urea and formaldehyde in the molar ratio of formaldehyde to urea between 1.55:1 and 1.05:1 in a faintly acid aqueous solution of pH around 6, to produce a primary reaction product, allowing the reaction to go forward at room temperature for a time until the urea has combined with the formaldehyde, arresting the reaction while the primary products are still water-soluble and the solution of primary reaction products is still a mobile liquid, by evaporating the water from the liquid solution at a temperature insufficient to produce any substantial resinification until a dry, solid, fusible, primary formaldehyde-urea reaction product containing not more than 2 per cent physical moisture is obtained, said drying temperature not exceeding 60° C. and then completing the reaction in a hot mold under the influence of heat and pressure, to form said stable, infusible articles without substantial evolution of volatiles sufficient to cause vesiculation and blistering.

2. In the manufacture of improved molding compositions containing formaldehyde-urea reaction products, the steps of making a potential resin which comprises mixing together formaldehyde and urea in acid aqueous solution, the molecular proportion of formaldehyde to urea being between 1.05:1 and 1.55:1 and the acidity of said mixture being between 5 and 6 pH, maintaining the mixture at a relatively low temperature not exceeding 60° C. until a mobile reaction solution containing an initial water-soluble reaction product is formed and arresting the reaction by mixing the slightly acid solution of initial reaction product so obtained with sufficient fibrous cellulosic filler to produce a moist mass of impregnated filler and evaporating off the contained water, from the slightly acid moist mass so produced, at a temperature not exceeding 60° C. to recover a substantially dry solid molding composition capable of being molded under heat and pressure at a temperature of about 140° C. and a pressure of 1 ton per square inch without substantial liberation of volatiles sufficient to cause vesiculation and blistering.

3. The process of claim 2 wherein said reaction temperature is room temperature.

4. The process of claim 2 wherein an acid commercial formaldehyde solution is partially neutralized with an organic amine to obtain a pH between 5 and 6, the said organic amine being non-reactive with formaldehyde, urea is dissolved in said solution and the mixture is permitted to stand undisturbed for several hours thereby obtaining an initial reaction going forward to a substantial extent but without production of gelling or development of insolubles, thereby producing a mobile solution of initial water-soluble formaldehyde-urea condensation product, free of mineral salines and capable of impregnating and saturating fibrous cellulosic fillers.

5. The process of claim 2 wherein the ratio of formaldehyde to urea is 1.3:1, the acidity is about pH 6 and the reaction is effected at room temperatures.

6. The process of claim 1 wherein the said solution of initial reaction product is adjusted to a pH between 4 and 5 just prior to arresting the reaction by drying and the dry acid-reacting mixture so obtained is resinified under heat and pressure, the resinification being at temperatures around 140° C. under a pressure of about 1 ton per square inch.

7. In the process of claim 2, facilitating evaporating off the contained water and the preparation of a molding powder wherein the slightly acid liquid reaction solution is admixed with an absorbent cellulosic filler in amount sufficient to produce a moist mass of impregnated filler by increasing the acidity to a point between 4 and 5 pH just prior to drying and then drying the moist mass at a temperature below 60° C. in a current of warm air.

8. An improved molding powder comprising a substantially dry composition of an absorbent, fibrous filler impregnated with a potential resin having formaldehyde and urea residues combined in a ratio between 1.05:1 and 1.55:1, said potential resin being an arrested low temperature, acid-condensed reaction product of formaldehyde and urea in said ratio produced at a low temperature not exceeding 60° C. in a faintly acid aqueous solution having a pH between 4 and 7, and being soluble, fusible and substantially free of volatiles, said potential resin on exposure to heat at molding temperature, first flowing under the pressure and then resinifying without substantial evolution of volatiles sufficient to cause vesiculation and blistering to produce a hard infusible stable resin, the two actions being consecutive and rapid at temperatures around 140° C. under pressure of about 1 ton per square inch.

9. The molding powder as set forth in claim 8 in which the filler is a fibrous cellulosic filler.

10. The molding powder as set forth in claim 8 in which the filler is paper pulp.

11. An improved substantially dry molding composition comprising a body of paper pulp impregnated and saturated with an arrested initial reaction product of formaldehyde and urea, said body of paper pulp being a preshaped and formed body, said arrested initial reaction product being a potential resin having formaldehyde and urea residues combined in a ratio between 1.05:1 and 1.55:1, being an arrested, low temperature, acid-condensed, initial reaction product of formaldehyde and urea in said ratio, being soluble, fusible and substantially free of volatiles, said potential resin further being capable of heat-hardening without substantial liberation of volatiles at temperatures around 140° C. and being in said molding composition capable, when under a temperature around 140° C. and pressure of one ton per square inch, of flowing sufficiently to become compacted and dense, prior to heat-setting.

12. In the manufacture of molding powders, the improved process of preparing dry, fusible, rapidly heat-setting powders containing arrested initial reaction products of urea and formaldehyde which comprises dissolving urea in slightly acid aqueous solution of formaldehyde at a pH value between 4 to 7, the molecular ratio of formaldehyde to urea being in the range between 1.05:1 and 1.55:1, maintaining the mixture at a temperature not exceeding 30° C. for a time sufficient to effect substantial reaction without formation of a precipitate, mixing the slightly acid mobile solution of initial formaldehyde-urea reaction product so obtained with a sufficient amount of finely divided cellulosic filler to produce a moist mass and then drying the slightly acid moist mass of cellulosic filler, impregnated with the said solution, at a temperature not exceeding 60° C., in a current of warm air until a substantially dry molding powder capable of being molded under heat and pressure, without the liberation of volatiles sufficient to cause vesiculation and blistering at temperatures around 140° C. and under pressures of about 1 ton per square inch.

13. As an improvement in the manufacture of pressure-shaped, heat-hardened, molded articles which are stable, insoluble and infusible from molding compositions containing fusible formaldehyde-urea reaction products having formaldehyde and urea combined in substantially the same molar ratio in which they are to be fixedly combined in the final infusible molded article, the improvement which comprises partially neutralizing the acidity of a commercial aqueous formaldehyde solution with an organic amine capable of permanently adjusting the said acidity to between a pH of 4 to 7 but incapable of reacting with the formaldehyde content thereof, adding urea in the proportion of 1 molecule to every 1.5 molecules of $CH_2O$ present, allowing the mixture to stand at a temperature between 20° and 30° C. until the initial reaction is substantially completed and a slightly acid mobile liquid is produced, adding paper pulp in a proportion sufficient to make a moist, open textured mass, drying the moist material having a pH between 4 and 5 at temperatures not exceeding 60° C. until substantially all the water is removed and comminuting the dried material to a state of fineness suitable for a molding powder.

14. An improved molding composition, said composition being dry and comprising in addition to other ingredients, an arrested, acid-condensed, initial low temperature reaction product of urea and formaldehyde, said reaction product having formaldehyde and urea combined in approximately the ratio of 1.5:1 and being a soluble, fusible, heat-setting body, the reaction product in said molding compositions being capable of softening and of then heat-hardening, said dry molding composition being capable, at temperatures around 140° C. under pressures of about 1 ton per square inch, of conversion into solid, insoluble, infusible, stable, molded articles, without liberation of substantial amounts of volatiles.

15. In the manufacture of articles from dry molding compositions containing fusible, substantially volatile free urea-formaldehyde condensation products, having formaldehyde and urea combined in a molar ratio substantially the same as that in which they are to be fixedly combined in the final molded article the process steps which comprises forming, in a controlled manner, at temperatures not exceeding 60° C. in an aqueous solution having a pH between 4 and 7, an initial reaction product of urea and formaldehyde having formaldehyde and urea combined in a ratio of approximately 1.5:1 and then arresting reaction and isolating said initial reaction product without substantial polymerization or resinification by removing the water and other volatiles at relatively low temperatures not exceeding 60° C. prior to the development of insolubility.

16. As an improvement in the manufacture of urea-formaldehyde condensation products by a process wherein urea and formaldehyde are reacted together in aqueous solution and reaction is arrested by drying at low temperatures to recover a dry, fusible solid product, the method which comprises restricting the ratio of formaldehyde to urea to approximately 1.5:1, adjusting the acidity of the aqueous reaction medium to approximately pH 6 and arresting the reaction after it has gone forward to a substantial extent but before insolubility or gelling occur, by evaporating the water and other uncombined volatiles at temperatures not exceeding 60° C. until dry solid compositions are obtained capable of being molded at temperatures about 140° C. under a pressure of 1 ton per square inch without liberation of sufficient volatiles to cause vesiculation and blistering.

ARTHUR M. HOWALD.